US 8,447,470 B2

(12) United States Patent
Barthomeuf et al.

(10) Patent No.: US 8,447,470 B2
(45) Date of Patent: May 21, 2013

(54) METHOD FOR DETERMINING, IN REAL TIME, THE GRIP ON A STEERING WHEEL OF AN ELECTRIC POWER-ASSISTED STEERING SYSTEM FOR AUTOMOBILE

(75) Inventors: Julien Barthomeuf, Saint Genis Laval (FR); Stephane Cassar, Lyons (FR)

(73) Assignee: JTEKT Europe, Irigny (FR)

( * ) Notice: Subject to any disclaimer, the term of this patent is extended or adjusted under 35 U.S.C. 154(b) by 1097 days.

(21) Appl. No.: 12/083,633

(22) PCT Filed: Sep. 28, 2006

(86) PCT No.: PCT/FR2006/002199
§ 371 (c)(1),
(2), (4) Date: Jun. 10, 2008

(87) PCT Pub. No.: WO2007/045735
PCT Pub. Date: Apr. 26, 2007

(65) Prior Publication Data
US 2009/0069981 A1    Mar. 12, 2009

(30) Foreign Application Priority Data

Oct. 19, 2005    (FR) ..................................... 05 10653

(51) Int. Cl.
*B62D 6/08*    (2006.01)
*B62D 6/10*    (2006.01)
*B62D 5/00*    (2006.01)

(52) U.S. Cl.
USPC .............. 701/42; 701/41; 280/93.5; 280/771; 180/443; 180/446

(58) Field of Classification Search
USPC .............. 701/41, 42; 280/771, 93.5; 180/443, 180/446
See application file for complete search history.

(56) References Cited

U.S. PATENT DOCUMENTS

| 5,504,403 | A  | * | 4/1996 | McLaughlin | 318/432 |
| 6,114,949 | A  |   | 9/2000 | Schmitz et al. | |
| 7,100,735 | B2 | * | 9/2006 | Burton et al. | 180/446 |
| 7,185,731 | B2 | * | 3/2007 | Farrelly et al. | 180/412 |
| 2002/0169531 | A1 | * | 11/2002 | Kawazoe et al. | 701/41 |
| 2004/0148078 | A1 | * | 7/2004 | Nakano et al. | 701/41 |
| 2005/0150711 | A1 | * | 7/2005 | Burton et al. | 180/443 |
| 2005/0242965 | A1 |   | 11/2005 | Rieth et al. | |
| 2007/0205041 | A1 | * | 9/2007 | Nishizaki et al. | 180/446 |
| 2010/0152952 | A1 | * | 6/2010 | Lee et al. | 701/29 |

FOREIGN PATENT DOCUMENTS

| EP | 0 900 711 A2 | 3/1999 |
| EP | 1 508 496 A2 | 2/2005 |
| WO | WO 2004/022409 A2 | 3/2004 |

* cited by examiner

*Primary Examiner* — Ruth Ilan
*Assistant Examiner* — Barry Gooden, Jr.
(74) *Attorney, Agent, or Firm* — Oliff & Berridge, PLC

(57) ABSTRACT

The invention concerns a method which includes: filtering the torque signal using a low-pass filter of the first order at a variable cut-off frequency which takes on, respectively, a minimum value or a maximum value depending on whether the amplitude of the torque signal is, respectively, lower or higher than a predetermined threshold; then in producing a signal indicating, respectively, a steering wheel release or a steering wheel grip depending on whether the amplitude of the filtered torque signal is, respectively, lower or higher than a predetermined threshold.

4 Claims, 7 Drawing Sheets

METHOD FOR DETERMINING, IN REAL TIME, THE GRIP ON A STEERING WHEEL OF AN ELECTRIC POWER-ASSISTED STEERING SYSTEM FOR AUTOMOBILE

The present invention generally relates to automobiles equipped with electric power-assisted steering. More particularly, this invention relates to a method for determining, in real time, the gripping by the driver of a steering wheel of an electric power-assisted steering system for automobile.

FIG. 1 recalls the main elements composing an electric power-assisted steering system for automobile. Such a steering system comprises, on the one hand, a mechanical part comprising a steering wheel 2 with rotating link to a steering column 3, whose end opposite to the steering wheel 2 carries a steering pinion engaged with a rack 4, mounted in a sliding manner within a steering enclosure 5. The two opposing ends of the rack 4 are respectively linked, by means of track rods 6 and 7, to the left and right drive wheels (not shown) of the vehicle. In order to assist the manual effort exerted by the driver of the vehicle on the steering wheel 2, the steering system comprises a power-assist electric motor 8 with two directions of rotation, whose exit shaft is coupled, via a speed reducer 9, notably a worm screw and gear wheel, to the steering column 3, in such a manner as to transmit a motor torque (and potentially also a resisting torque) to this steering column 3. The power-assist electric motor 8 is controlled by an onboard electronic computer 10, which receives and processes various signals coming from sensors.

In a typical embodiment; the electronic computer 10 receives an electrical signal coming from a sensor 11 for the angle of the steering wheel 2, representative of the instantaneous steering angle of the automobile in question, and this computer 10 also receives a signal coming from a torque sensor 12 placed on the steering column 3, and thus measuring the torque exerted by the driver on the steering wheel 2. In the example illustrated, a further sensor 13 is provided for the instantaneous position of the power-assist electric motor 8.

Using these various pieces of information, and possibly parameters external to the steering system, such as the speed of the vehicle, the electronic computer 10 controls the power-assist electric motor 8, by continually defining a power-assist torque or effort that can amplify, or on the contrary compensate, the effort applied by the driver on the steering wheel 2, according to pre-defined "power-assist laws".

In order to ensure maximum driving comfort, the electronic computer applies various "strategies" for controlling the power-assist depending on the driving phases. In particular, certain strategies must be activated only when the driver is not holding the steering wheel, for example, in order to be able to perform real-time calibrations of the steering system.

In order to carry out these operations, it therefore proves to be necessary to be able to distinguish gripping, even very light, of the steering wheel by the driver from a total release of the latter, for example at a red light. This detection can prove to be necessary both when the vehicle is stationary and when it is moving.

The current methods allowing the release or gripping of the steering wheel 2 to be detected generally consist in comparing the amplitude of the signal from the torque sensor 12 with a predetermined threshold. The steering wheel 2 is said to be released when the amplitude of the torque signal is below this threshold, or said to be gripped when the amplitude of the torque signal is higher than this threshold.

The curve in FIG. 2 shows the variation with time of the signal c of torque on the steering wheel from the sensor 12 after a steering wheel release (region c1) then a re-gripping (region c2) with a change of direction by the driver.

By way of illustration of the principles of the current methods for detection of steering wheel gripping, the curve in FIG. 3 shows the variation with time of a Boolean signal I indicating a steering wheel release produced by a known detection method. This signal is activated (I=1) when the torque signal c is within a range of values included between −1 Nm and +1 Nm.

It can be seen in FIG. 2, in particular after the release of the steering wheel (region c1), that the signal c from the torque sensor 12 shows a significant amount of interference in the form of oscillations due to the road which travel back up to the steering wheel 2 and are then measured by the sensor 12. The noise on the torque signal c then affects the indicator signal I for steering wheel release (see FIG. 3) and renders the latter virtually unusable.

Similarly, when the vehicle is moving and the driver grips the steering wheel nevertheless firmly, the torque exerted on the steering wheel by the driver may be compensated by the effort coming from the hub bearing unit of the vehicle and the signal c may momentarily stray into the range included between −1 and +1 Nm in such a manner that the signal I is activated.

For this reason, a simple measurement of the torque on the steering wheel and its comparison with respect to a threshold is not sufficient for reliably detecting a release or a gripping of the steering wheel.

The present invention aims to avoid this drawback by providing a method that allows it to be reliably determined, with as short a delay as possible, whether a steering wheel of an electric power-assisted steering system for automobile is or is not being gripped, in order to be able to execute, virtually in real time, as soon as the steering wheel is released, control and power-assist algorithms for the steering system.

For this purpose, the subject of the invention is a method for determining, in real time, the grip on a steering wheel of an electric power-assisted steering system for automobile, the steering system comprising a power-assist electric motor controlled by an onboard electronic computer, notably using a signal from measurement of the torque on the steering wheel by a sensor disposed on the steering column, characterized in that this method consists:

in filtering the torque signal by means of a first-order low-pass filter with a variable cutoff frequency that respectively takes a minimum value or a maximum value depending on whether the amplitude of the torque signal is, respectively, lower or higher than a predetermined threshold which distinguishes the released and gripped states of the steering wheel, then, in producing a signal respectively indicating release of the steering wheel or gripping of the steering wheel depending on whether the amplitude of the filtered torque signal is, respectively, lower or higher than a predetermined threshold.

In an advantageous manner, the minimum cutoff frequency of the filter is very low, around 7 Hz, in order to filter out the oscillations from the road transferred by the steering system onto the steering wheel.

The maximum cutoff frequency of the filter is advantageously very much higher than its minimum cutoff frequency, of the order of 1000 Hz, in order to obtain a sufficiently fast response time. The reason for this is that, at low frequency, digital low-pass filters exhibit a response time that is too long to allow a fast enough detection of the gripping of the steering wheel.

Thus, the method according to the invention provides a signal, continually updated, that indicates in a few tenths of milliseconds whether the steering wheel is being released or being gripped by the driver.

The steering wheel grip or release signals are addressed to an electronic computer with a view to being processed for the control of the power-assist electric motor. They can be used locally within the steering system, but may also be transmitted via the onboard network within the vehicle for any other application, for example in order to warn the driver in the case of falling asleep at the wheel, etc.

The invention will in any case be better understood with the aid of the description that follows, which makes reference to the appended schematic drawing illustrating, by way of example, one embodiment of this method.

Figure 3:
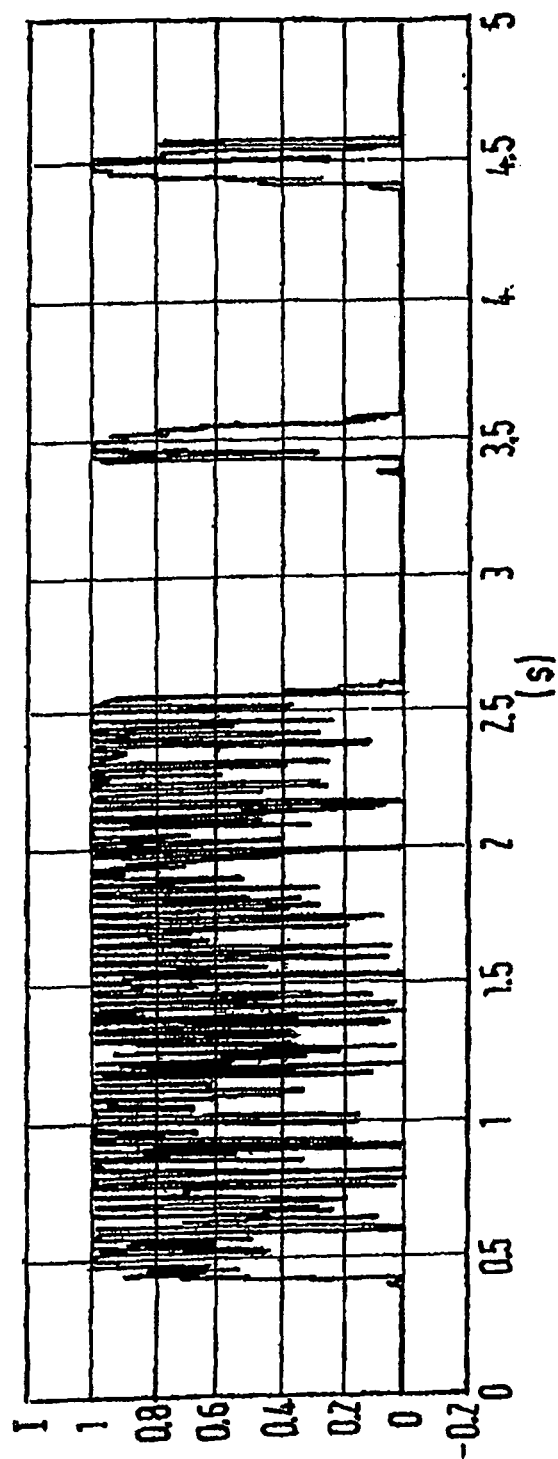
FIG. 3 (already discussed) shows a curve versus time of a signal indicating steering wheel grip/release provided by a method according to the prior art on the previous steering system.
Figure 4:
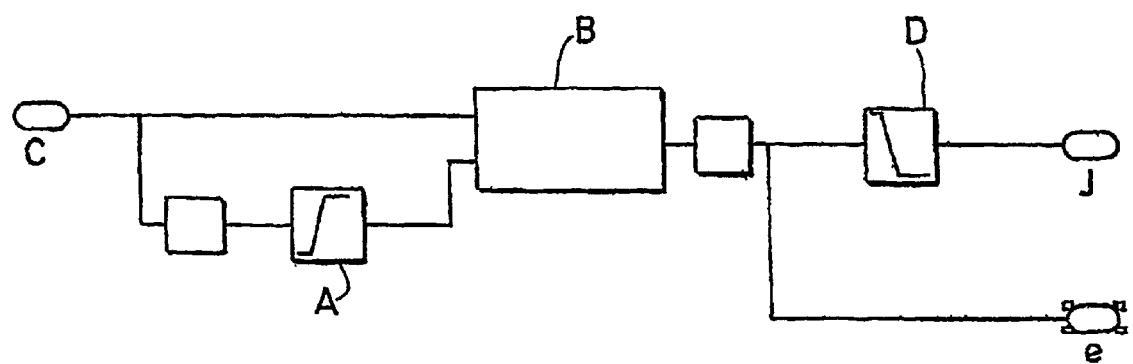
FIG. 4 is a block diagram illustrating an adaptive filtering method according to the invention.

The method according to the invention is shown in the form of three main blocks A, B and D in FIG. 4. This method essentially consists in performing an adaptive filtering of the torque signal c coming from a sensor 12 for measuring the torque exerted on a steering wheel 2 of an electric power-assisted steering system such as described in the introduction. The adaptive filtering is achieved by means of a first-order low-pass filter with variable cutoff frequency f, symbolized by the block B in FIG. 3. The value of the cutoff frequency f of the low-pass filter is determined by a table within the first block A, as a function of the amplitude (absolute value) of the torque signal c.

Figure 5:
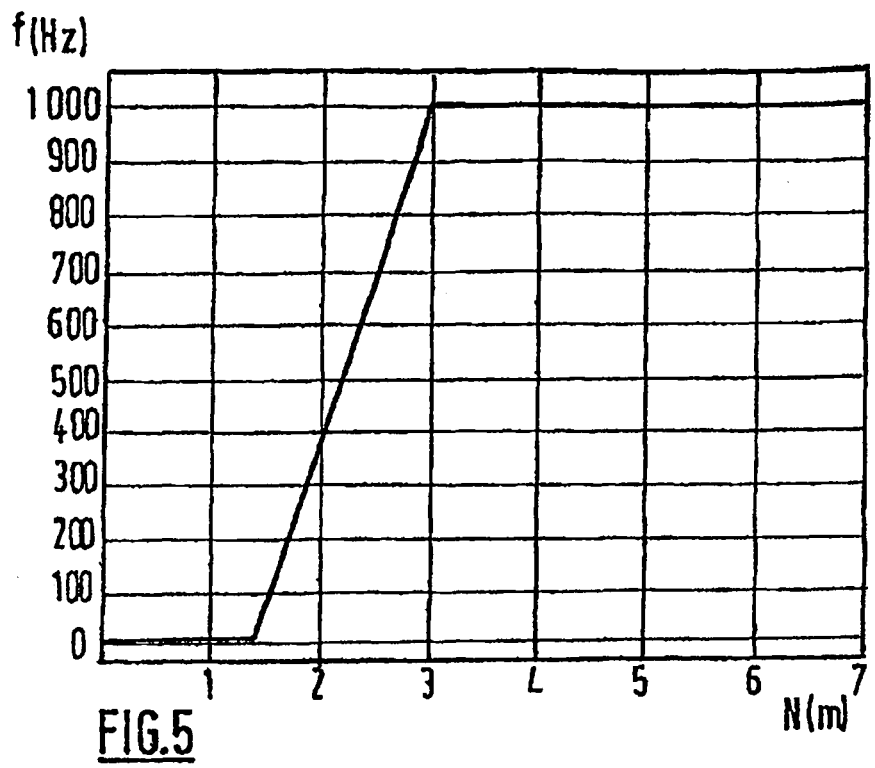
FIG. 5 shows a curve of the cutoff frequency of the filter in FIG. 4 as a function of the torque signal measured on the steering wheel.

As indicated in FIG. 5, the cutoff frequency f takes a minimum value around 7 Hz when the amplitude of the torque signal c is low, in other words less than 1.4 Nm. When the amplitude of the torque signal c is in the range between 1.4 Nm and 3 Nm, the cutoff frequency f is proportional to the amplitude of the torque signal c. Lastly, when the amplitude of the torque signal c is high, in other words greater than 3 Nm, the cutoff frequency f takes a maximum value of the order of 1000 Hz, in order to quickly detect a re-gripping of the steering wheel.

Figure 7:
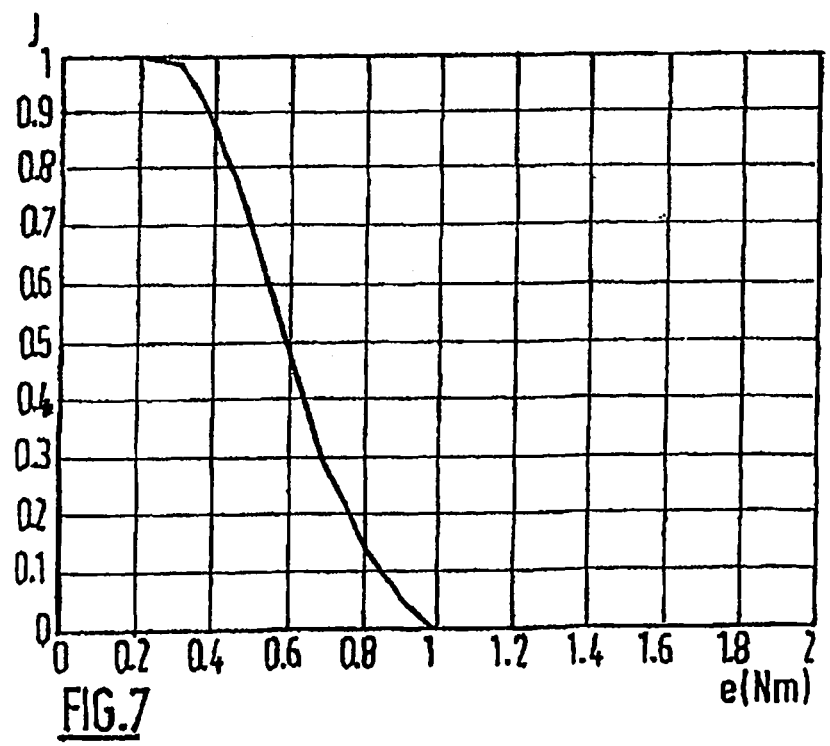
FIG. 7 shows a curve of a signal indicating steering wheel grip/release provided by the method in FIG. 4 as a function of the filtered torque signal in FIG. 6.
Figure 6:
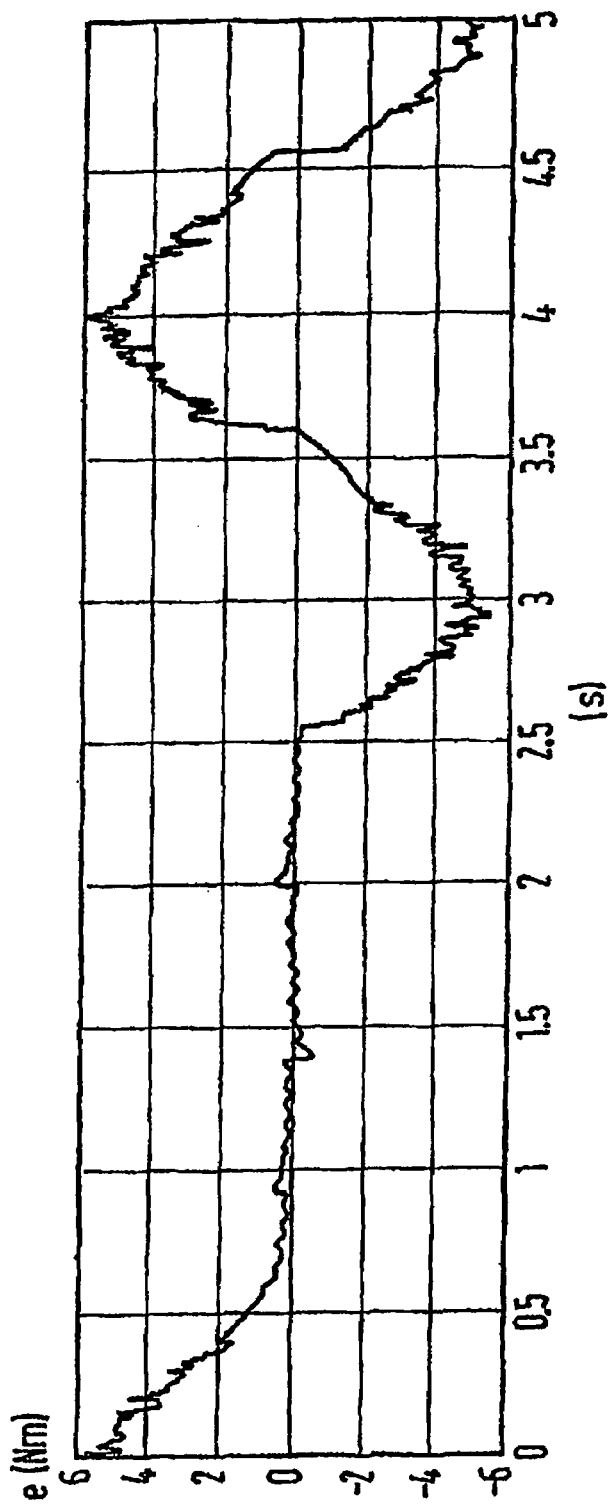
FIG. 6 shows a curve versus time of the torque signal filtered by the method in FIG. 4.

A filtered torque signal, at the output of the filtering block B in FIG. 3, is shown in FIG. 6. A signal J, in the range between 0 and 1, indicating steering wheel gripping or release, at the output of the last block D in FIG. 3, is illustrated in FIG. 7. The signal J is determined as a function of the amplitude (absolute value) of the filtered torque signal e. When the amplitude e of the filtered torque signal is lower than 0.2 Nm, the signal J takes the value 1 and indicates that the steering wheel has been released. When the amplitude e of the filtered torque signal is higher than 1 Nm, the signal J takes the value 0 and indicates that the steering wheel is being gripped.

Figure 1:
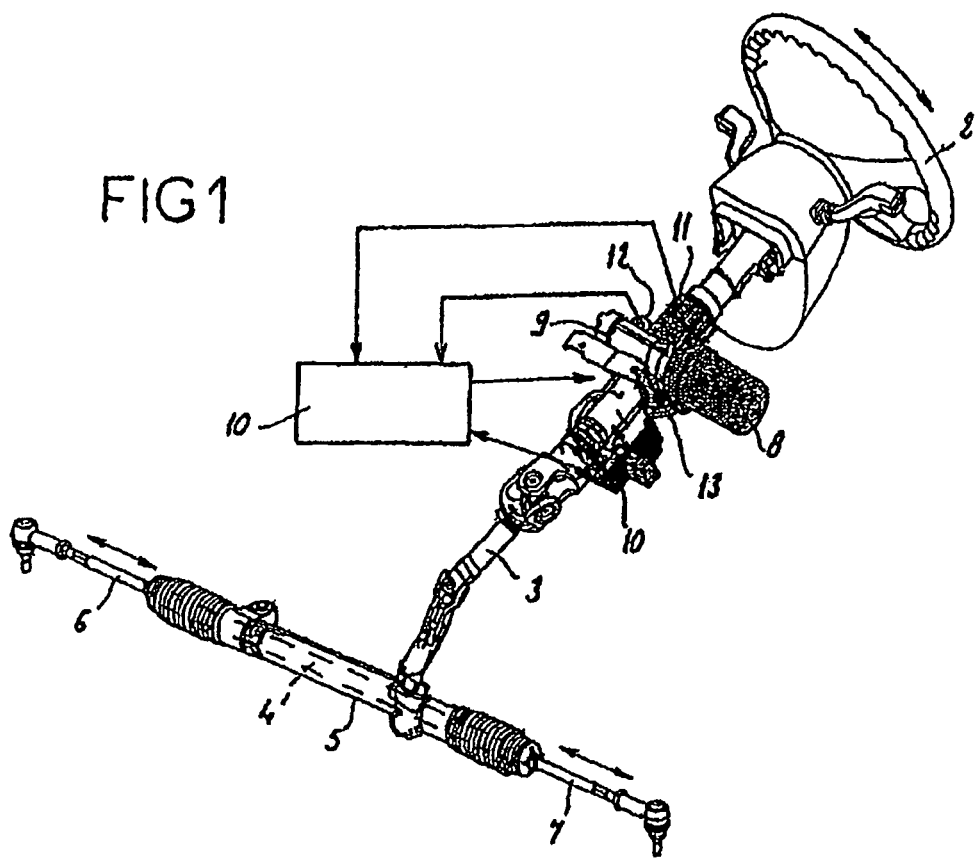
FIG. 1 (already discussed) is a schematic perspective view of an electric power-assisted steering system capable of implementing the method of the invention.
Figure 2:
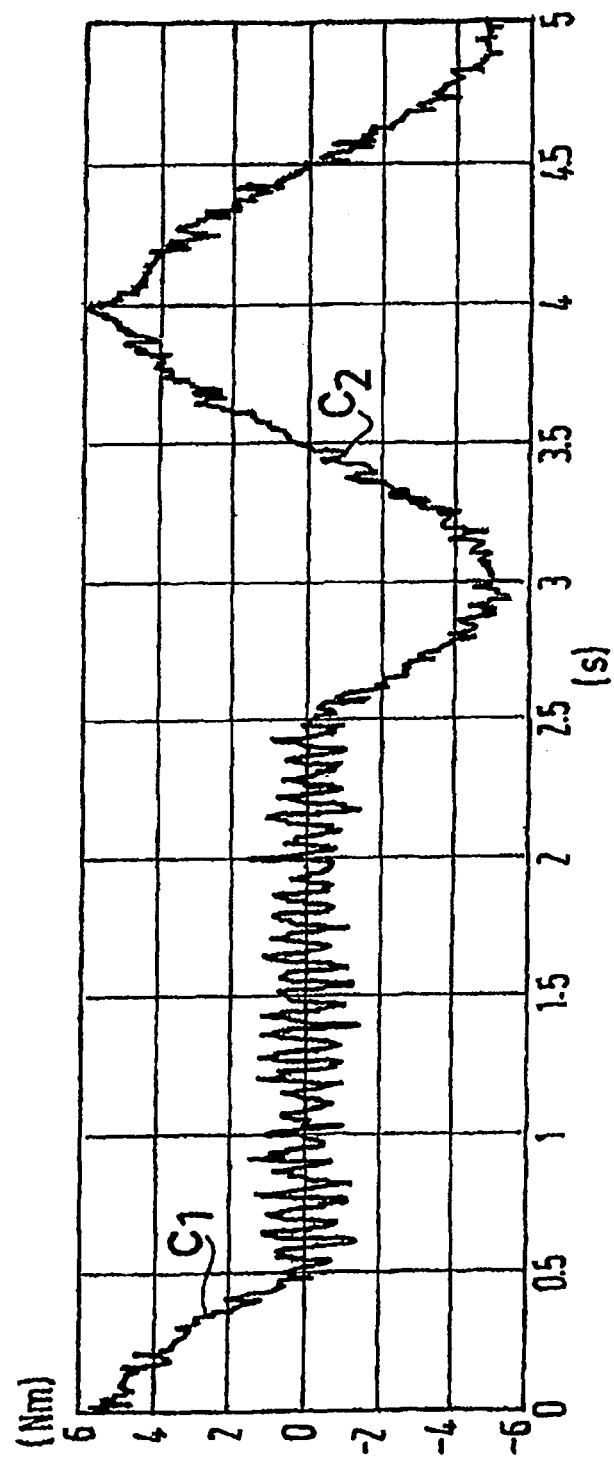
FIG. 2 (already discussed) shows a curve versus time of the torque signal measured on the steering system in FIG. 1.
Figure 8:
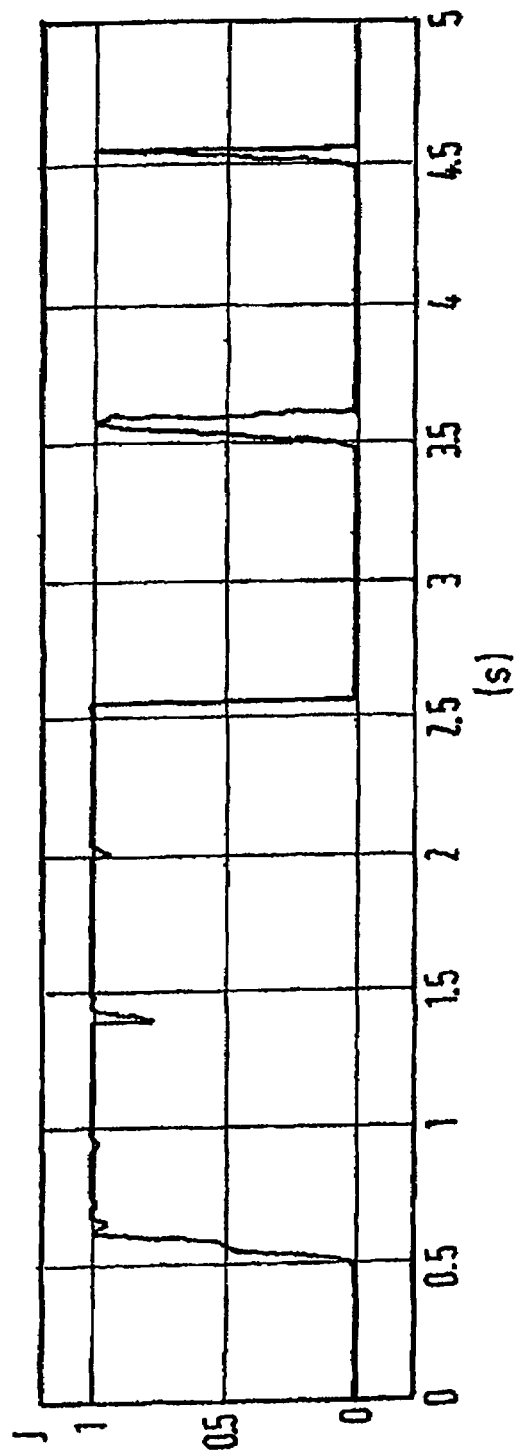
FIG. 8 shows a curve versus time of the signal indicating steering wheel grip/release in FIG. 7.

As is shown in FIG. 8, in the case of a steering wheel release (region c1 in FIG. 2), the variations of the torque on the steering wheel are filtered and the indicator J exhibits a very stable value that is certainly more reliable than the signal I in FIG. 3. In the case of a change of direction (region c2 in FIG. 2), the indicator J goes momentarily to the value 1.

In contrast to the known systems for detecting gripping of the steering wheel, the solution developed by the applicant does not need any sensor or additional equipment. Only a specific control strategy is implemented within the electronic computer 10 in order to obtain this information that can therefore be used as a complement (in the case of a redundant solution) or as a replacement for the solutions of the prior art.

It goes without saying that the invention is not limited to the single embodiment of this method that has been described hereinabove by way of example; on the contrary, its scope encompasses all the embodiment and application variants adhering to the same principle. In particular, the profiles of the various curves indicated are only explanatory examples that may actually, in detail, give rise to various variants and adaptations. Lastly, the technical means for implementing the method also remain highly variable, without straying from the scope of the invention.

The invention claimed is:

1. A method for determining, in real time, a grip on a steering wheel of an electric power-assisted steering system for an automobile, the steering system comprising a power-assist electric motor controlled by an onboard electronic computer, using a signal for measurement of a torque on the steering wheel by a sensor disposed on a steering column, the method comprising:
    filtering a torque signal by means of a first-order low-pass filter with a variable cutoff frequency that respectively takes a minimum value or a maximum value depending on whether an amplitude of the torque signal is, respectively, lower than a predetermined minimum threshold or higher than a predetermined maximum threshold, then
    producing a signal respectively indicating release of the steering wheel or gripping of the steering wheel depending on whether the amplitude of the filtered torque signal is, respectively, lower or higher than a predetermined threshold.

2. The method as claimed in claim 1, wherein the maximum cutoff frequency of the filter is to the order of 1000 Hz.

3. The method as claimed in claim 1, wherein the minimum cutoff frequency of the filter is around 7 Hz.

4. The method as claimed in claim 3, wherein the maximum cutoff frequency of the filter is to the order of 1000 Hz.

* * * * *